United States Patent
Swope et al.

(10) Patent No.: US 12,206,643 B1
(45) Date of Patent: Jan. 21, 2025

(54) SYSTEM AND METHOD FOR ENABLING SENSORS WITH UNIQUE ADDRESSES

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/518,248

(22) Filed: Nov. 22, 2023

(51) Int. Cl.
*H04L 61/5038* (2022.01)
*H04L 101/618* (2022.01)

(52) U.S. Cl.
CPC .... *H04L 61/5038* (2022.05); *H04L 2101/618* (2022.05)

(58) Field of Classification Search
CPC .......... H04L 61/5038; H04L 2101/618; G06F 3/014; G06F 3/016; G06F 3/0346
USPC ........................................................ 709/245
See application file for complete search history.

(56) References Cited

U.S. PATENT DOCUMENTS

| 2019/0294250 A1* | 9/2019 | Martin | G06F 3/0346 |
| 2021/0326603 A1* | 10/2021 | Kempf | G06V 10/147 |

\* cited by examiner

*Primary Examiner* — Glenford J Madamba

(57) ABSTRACT

An example system includes: a set of sensors, each sensor having a programmable address; a set of microcontrollers, each microcontroller paired with one sensor from the set of sensors; a controller configured to: enable an operational state of the set of sensors to uniquely address each sensor in the set of sensors by sequentially, for each microcontroller in the set of microcontrollers, causing the microcontroller to activate the sensor paired with the microcontroller and assigning a unique address to the activated sensor; scan the set of sensors using the unique address of each sensor to obtain data detected by the sensor.

13 Claims, 5 Drawing Sheets

SYSTEM AND METHOD FOR ENABLING SENSORS WITH UNIQUE ADDRESSES

BACKGROUND

Devices enabled with inter-integrated circuits (I2C) communications are convenient for their low cost and simplicity. However, when multiple of the same type of device are utilized in the same system, additional support hardware (e.g., wires, multiplexers, extenders, etc.) used to reprogram an address of each device complicates the system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
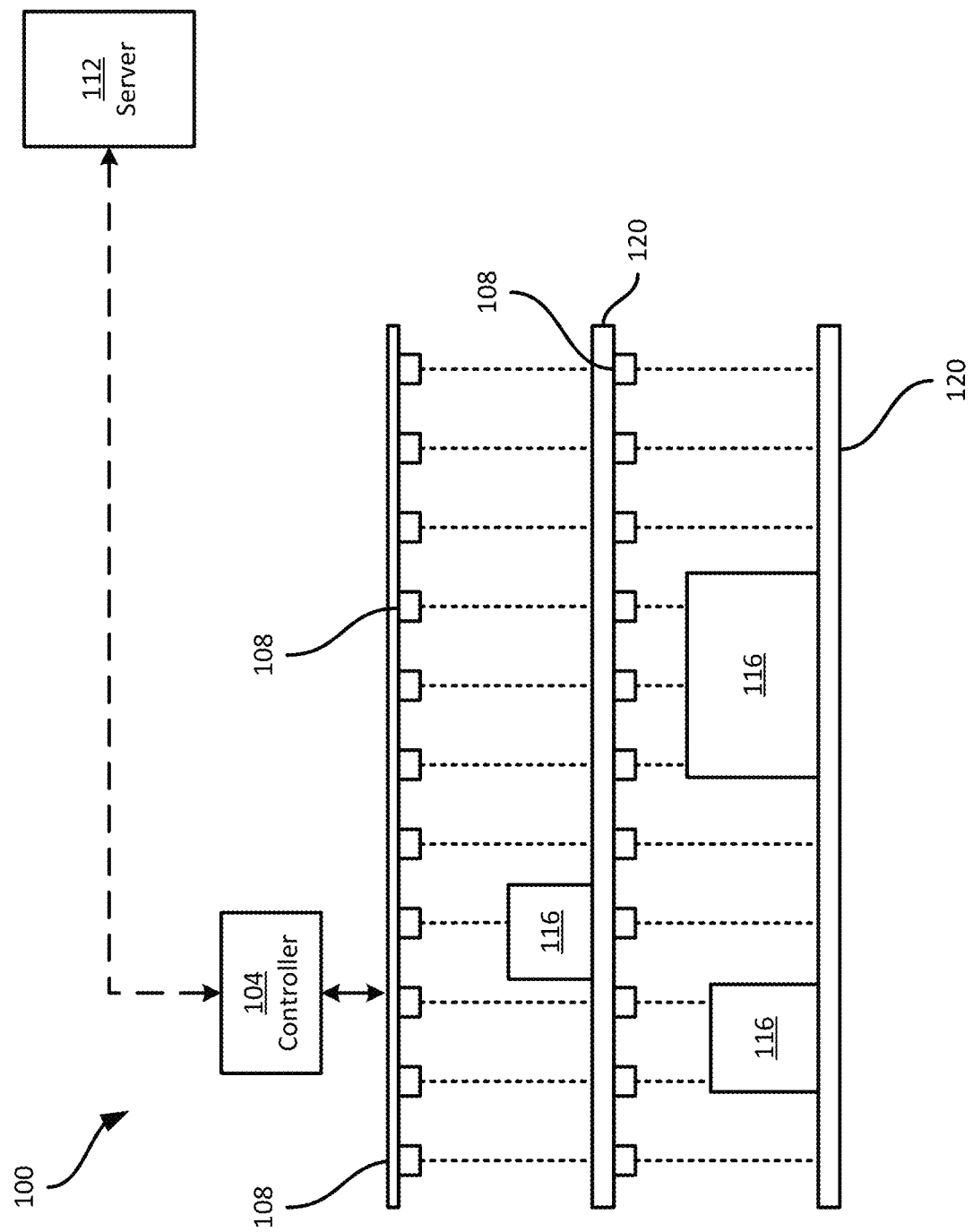
FIG. 1 is a diagram of a system for enabling sensors with unique addresses.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system comprising: a set of sensors, each sensor having a programmable address: a set of microcontrollers, each microcontroller paired with one sensor from the set of sensors: a controller configured to: enable an operational state of the set of sensors to uniquely address each sensor in the set of sensors by sequentially, for each microcontroller in the set of microcontrollers, causing the microcontroller to activate the sensor paired with the microcontroller and assigning a unique address to the activated sensor: scan the set of sensors using the unique address of each sensor to obtain data detected by the sensor.

Additional examples disclosed herein are directed to a method comprising: enabling an operational state of a set of sensors to uniquely address each sensor in the set by sequentially, for each microcontroller in a set of microcontrollers, causing the microcontroller to activate one sensor from the set of sensors, the sensor being paired to the microcontroller and assigning a unique address to the activated sensor; and scanning the set of sensors using the unique address of each sensor to obtain data detected by the sensor.

FIG. 1 depicts a system 100 for scanning a set of sensors in accordance with the teachings of this disclosure. The system 100 includes a controller 104 interconnected with a set of sensors 108. In some examples, the controller 104 may additionally be in communication with a server 112 via a communication link, illustrated in the present example as including wireless links. For example, the link may be provided by a wireless local area network (WLAN) deployed by one or more access points (not shown). In other examples, the server 112 is located remotely from the controller 104 and the link may therefore include one or more wide-area networks such as the Internet, mobile networks, and the like.

The controller 104 may be any suitable processor, microcontroller, microprocessor, processing core, combinations of the above, and the like. The controller 104 may cooperate with a memory (not shown) storing machine-readable instructions which when executed cause the controller 104 to realize the functionality described herein. Some or all of the memory may be integrated with the controller 104. The controller 104 and the memory may comprise one or more integrated circuits. For example, the controller 104 may be an Arduino Nano or other similar controller. In particular, the controller 104 may be configured for inter-integrated circuit (I2C) communications (i.e., utilizing a 4-wire configuration), and accordingly may communicate with the sensors 108 via an I2C address bus.

In the present example, the sensors 108 are proximity laser sensors configured to emit laser beams. In particular, the sensors 108 are configured as a laser curtain to detect items (e.g., packages 116) placed on a support surface such as a shelf 120. For example, the sensors 108 may be spaced at predefined intervals (e.g. 4-12 inches apart) based on the types of packages 116 expected on the shelf 120. In particular, when a package 116 is placed on the shelf 120, one or more laser proximity sensors 108 may detect a change in proximity (i.e., from the distance between the sensors 108 and the shelf 120 to the distance between the sensors 108 and the package 116 on the shelf 120). In other examples, other proximity sensors or other suitable types of sensors may also be employed. The system 100 may be deployed, for example in a transport and logistics facility, such as a warehouse or the like, in a transport vehicle, such as a delivery truck, or other suitable environments. In other examples, the sensors 108 may also be employed in other arrangements or configurations, according to the application of the sensors 108 in the environment.

In particular, the sensors 108 may be configured to for I2C communications to the controller 104. Preferably the sensors 108 may be configured with programmable addresses. That is, the sensors 108 may accept an assignment of a custom address to allow the controller 104 to uniquely poll and/or scan the set of sensors 108. However, such sensors 108 typically reset to a default state where the programmable addresses are reset to a predefined default address when the sensors are moved from an active mode (i.e., a normal operational mode) to a low-power, sleep, or shutdown mode. Accordingly, since each of the sensors 108 may be the same type of sensor with substantially identical configurations in accordance with the application (e.g., use in a laser curtain or the like) requirements, each of the sensors 108 may have a same default address upon the initialization and any subsequent reboot or other equivalent reset of the system 100. That is, the default address may be common to each of the sensors 108 (or in some examples, at least two sensors 108 having the same type).

In the default state, the controller 104 may not be able to individually poll each of the sensors 108, since each of the sensors 108 has the same default address. One solution to allow individual scanning of each sensor 108 is to configure each sensor 108 with an independent connection (i.e., line or wire) to the controller 104 to allow for individual polling of the sensors 108. However, this type of solution adds additional hardware (i.e., the additional wires or lines) and is incompatible with the simplicity of a 4-wire configuration of I2C communications.

Figure 2:
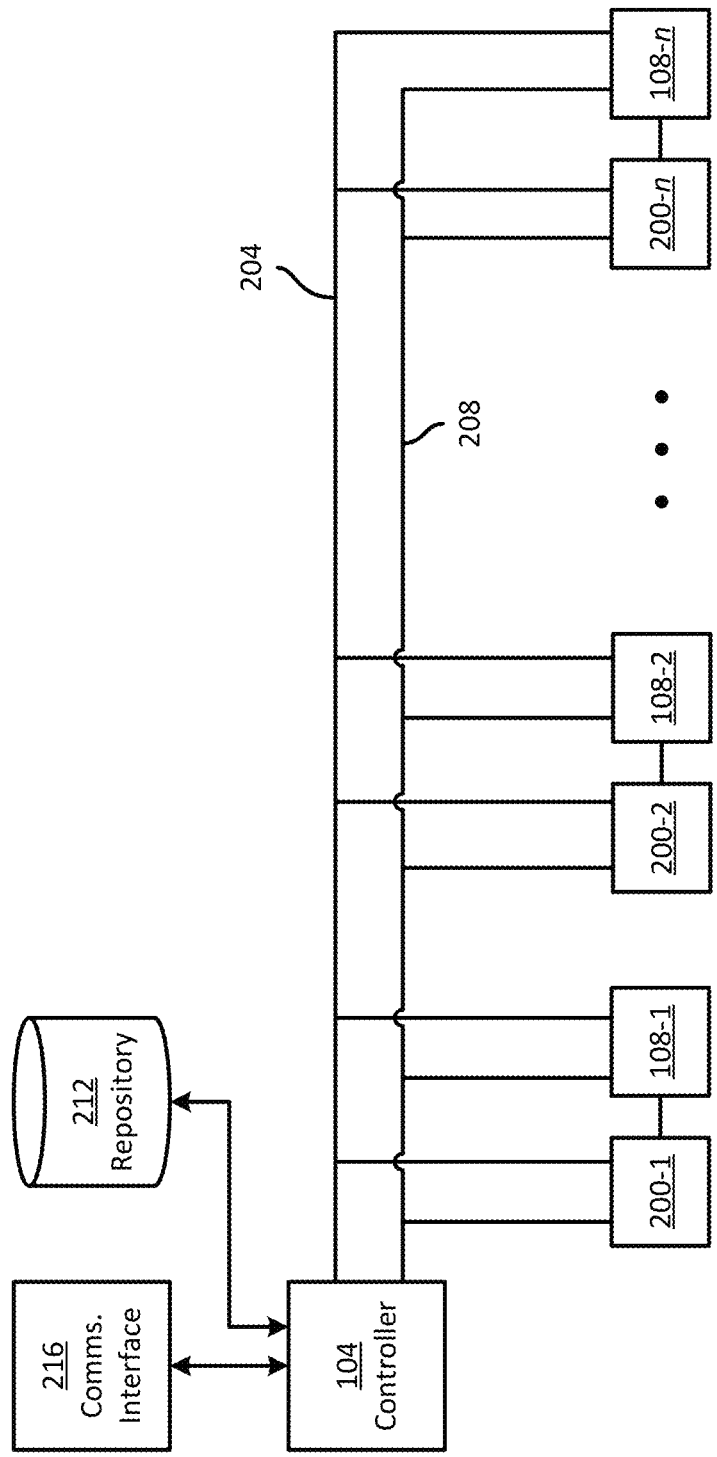
FIG. 2 is a diagram of certain components of the system of FIG. 1.

Thus, in accordance with the present disclosure and referring to FIG. 2, a diagram of the system 100 is depicted in further detail. In particular, FIG. 2 illustrates three exemplary sensors 108-1, 108-2, and 108-$n$ of the set of sensors 108 (i.e., referred to generically as a sensor 108 and collectively as the sensors 108: this nomenclature is also used elsewhere herein). The system 100 further includes a corresponding set of microcontrollers 200, of which three exemplary microcontrollers 200-1, 200-2, and 200-$n$ are depicted. The set of microcontrollers 200 corresponds to the set of sensors 108, such that each sensor 108 has a corresponding paired microcontroller 200. Thus, in the present example, the sensor 108-1 is paired with the microcontroller 200-1, the sensor 108-2 is paired with the microcontroller 200-2 and the sensor 108-$n$ is paired with the microcontroller 200-$n$.

The microcontrollers 200 may be any suitable processing device and may cooperate with a memory storing machine-readable instructions which when executed cause the microcontrollers 200 to realize the functionality described herein. Some or all of the memory may be integrated with the microcontrollers 200.

In particular, each microcontroller 200 is interconnected with its corresponding sensor 108 so as to control the sensor 108 to move between an active mode (i.e., to activate the sensor 108) and a sleep or shutdown mode (i.e., to deactivate the sensor 108). For example, each microcontroller 200 may be connected to a respective reset pin of the corresponding sensor 108. The microcontroller 200 may be configured to apply a high or low signal to the corresponding sensor 108 through the reset pin to activate the sensor 108 (i.e., wherein the sensor 108 is capable of detecting data and communicating with the controller 104) or deactivate the sensor 108 (i.e., wherein the sensor 108 reverts to a low-power or sleep mode). In other examples, other manners of connecting the microcontroller 200 to the sensor 108 to control the active and/or sleep modes of the sensor 108 are also contemplated.

Each of the sensors 108 and the microcontrollers 200 are connected to the controller 104 via a data line 204 and a clock line 208. In particular, when the controller 104 communicates to the sensors 108 and the microcontrollers 200 via I2C communications, the controller 104 the data line 204 may be a serial data line (SDA), while the clock line 208 may be a serial clock line (SCL).

In operation, once the system 100 is initialized to the default state, the controller 104 and the set of microcontrollers 200 are configured to cooperate to enable an operational state of the system 100, in which the set of sensors 108 are uniquely addressed (i.e., are assigned unique addresses), thereby allowing the controller 104 to uniquely poll and/or scan each of the sensors 108. In particular, in the default state (e.g., after the system 100 has been powered up and/or at another initialization), the microcontrollers 200 may be configured to cause the sensors 108 to remain deactivated, in the low-power or sleep mode as the default state. As part of the routine to enable the operational state, the controller 104 may be configured to iterate through each microcontroller 200 and sensor 108 pair in sequence to first cause the microcontroller 200 to activate the sensor 108 (i.e., to switch the sensor 108 from the sleep mode in the default state to the active mode), and then to assign the active sensor 108 a unique address.

Accordingly, the controller 104 may further include or be interconnected with a repository 212 (e.g., stored in the memory of the controller 104 or a separate memory bank) configured to store data for the enablement routine. In particular, the repository 212 may store the addresses of each of the microcontrollers 200, the predefined default address of each sensor 108 (e.g., a single default address for all of the sensors 108 in the set, or a set of default addresses for different subsets of the sensors 108, based on the type of sensor 108, for example), and unique target addresses for each of the sensors 108. For example, the repository 212 may store a target address to be assigned to the sensor 108 associated with a given microcontroller 200. In turn, the given microcontroller 200 may be identified in the repository 212 by its address. The repository 212 may additionally store an enablement indicator to indicate whether the sensor 108 has been enabled, by successfully assigning the target address to the sensor 108, as will be described further herein.

In other examples, the repository 212 may store the microcontroller address and the target addresses for the sensors 108 independently. For example, the repository 212 may store the microcontroller addresses and an associated enablement indicator to indicate whether the sensor 108 paired to the microcontroller 200 at the microcontroller address has been enabled. The repository 212 may additionally and independently store target addresses for the sensors 108 and an associated usage indicator to indicate whether the target address has been assigned to one of the sensors 108. In this example, the repository 212 may not correlate a specific target address to a particular microcontroller address.

In still further examples, other manners of defining, correlating, and tracking enablement of each of the sensors 108, the microcontrollers 200 and corresponding addresses are also contemplated.

Once the controller 104 has enabled the set of sensors 108 to uniquely address each sensor 108, the controller 104 may obtain data from the set of sensors 108 and may store and/or communicate the data to the server 112 or another remote computing device. Accordingly, the controller 104 may further include and/or be interconnected with a communications interface 216 enabling the controller 104 to exchange data with other computing devices, such as the server 112. The communications interface 216 includes suitable hardware (e.g., transmitters, receivers, network interface controllers, and the like) allowing the controller 104 to communicate with other computing devices. The specific components of the communications interface 216 are selected based on the type of network or other links that the controller 104 is to communicate over.

Figure 3:
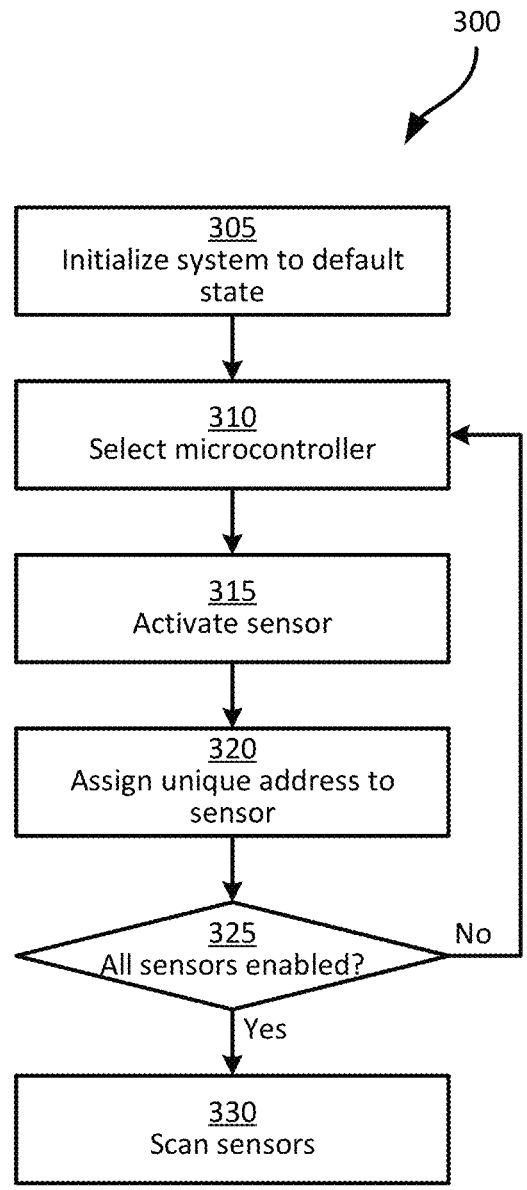
FIG. 3 is a flowchart of a method for enabling sensors with unique addresses.

Turning to FIG. 3, the functionality implemented by the system 100 will be discussed in greater detail. FIG. 3 illustrates a method 300 of enabling a set of sensors with unique addresses. The method 300 will be discussed in conjunction with its performance in the system 100, and particularly by the controller 104. In particular, the method 300 will be described with reference to the components of FIGS. 1 and 2. In other examples, the method 300 may be performed by other suitable devices or systems.

The method 300 is initiated at block 305, where the system 100 is initialized to the default state. For example, the system 100 may be initialized to the default state upon power up (e.g., immediately after installation or the like), in response to a system reset, waking up after a low-power or sleep state, or the like.

At initialization in the default state, each of the microcontrollers 200 is configured to maintain the corresponding sensor 108 in a low-power or inactive mode. Accordingly, in the default state, the sensors 108 are unable to receive commands or otherwise communicate with the controller 104. Accordingly, in response to the initialization of the system 100, the controller 104 may be configured to begin the enablement routine to enable the operational state of the system 100 and, more particularly, the set of sensors 108. The controller 104 may therefore update the repository 212 to reset each of the enablement and/or usage indicators associated with the microcontrollers 200 and/or the target addresses for the sensors 108.

The controller 104 is configured to iterate sequentially through each pair of microcontroller 200 and sensor 108 to assign a unique address to the sensor 108. Accordingly, at block 310, the controller 104 is configured to select a microcontroller 200. In particular, the controller 104 selects a microcontroller 200 whose paired sensor 108 has not yet been enabled or assigned a unique address. For example, the controller 104 may select a microcontroller 200 which has a corresponding enablement indicator which indicates that the paired sensor 108 has not yet been enabled.

At block 315, the controller 104 is configured to cause the microcontroller 200 selected at block 310 to activate the sensor 108 associated with the microcontroller 200. For example, the controller 104 may obtain the microcontroller address for the selected microcontroller 200 and send a data signal via the data line 204 to the microcontroller address. In response to the data signal, the microcontroller 200 activates the sensor 108 paired to the microcontroller 200. For example, the microcontroller 200 may change the input signal to the reset pin of the sensor 108 from low to high (or vice versa) to set the sensor 108 to the active mode. In particular, in the active mode, the sensor 108 may send and receive data from other devices, such as the controller 104.

At block 320, the controller 104 is configured to assign a unique address to the sensor 108 which was activated at block 315. In particular, having recently been activated from the sleep mode, the sensor 108 is configured with the predefined default address from the default state. Accordingly, the controller 104 may obtain the default address for the sensor 108, for example from the repository 212, and send an instruction (e.g., a data signal) via the data line 204 to the default address. In particular, the data signal may include the unique target address defined in the repository 212 to which the address for the sensor 108 should be reassigned.

For example, if the repository 212 stores a target address in association with a given microcontroller address, then the controller 104 may obtain the target address associated with the microcontroller selected at block 310. If the repository 212 stores the available target addresses independently from the microcontroller addresses, then the controller 104 may simply select a target address with a usage indicator which indicates that the target address has not been assigned to one of the sensors 108.

In response to the data signal including the unique address for the sensor 108, the sensor 108 maybe configured to store the unique address as the address for the sensor 108. Thus, the sensor 108 may subsequently respond to signals on the data line which are addressed to the unique address, rather than the predefined default address of the sensor 108.

In some examples, the sensor 108 may optionally return a confirmation of successful assignment of the unique address to the controller 104, for example via the data line 204, or another line connecting the sensor 108 to the controller 104.

After sending the data signal with the unique target address or after receiving confirmation of the successful assignment of the unique address, the controller 104 may update the repository 212 to indicate that the sensor 108 associated with the microcontroller 200 selected at block 310 has been enabled (i.e., to update the enablement indicator to an affirmative indication).

Figure 4:
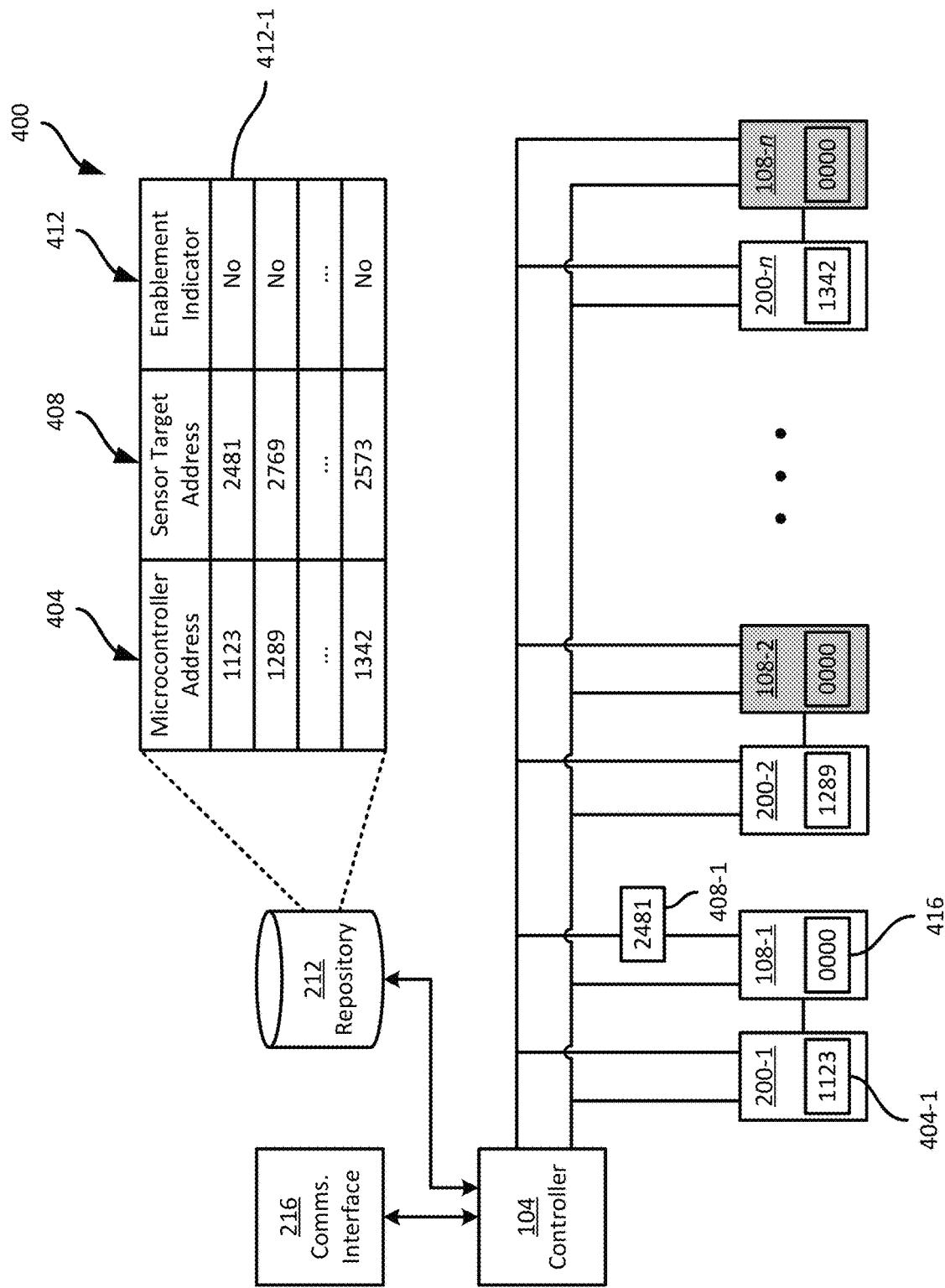
FIG. 4 is a diagram of an example performance of a first iteration of blocks 310 through 320 of the method of FIG. 3.

For example, referring to FIG. 4, a diagram of a first iteration through blocks 310 to 320 of the method 300 is depicted.

In particular, the repository 212 may store a table 400 mapping microcontroller addresses 404, target addresses 408 for the sensors 108, and enablement indicators 412. In particular, each of the target addresses 408 is unique. Accordingly, at block 310, the controller 104 may select a microcontroller 200 having a negative enablement indicator 412. For example, the controller 104 may select the microcontroller 200-1 having a negative enablement indicator 412-1 and a microcontroller address 404-1 having a value of "1123". At block 315, the controller 104 causes the microcontroller 200-1 to activate the corresponding sensor 108-1, for example by sending a signal to the microcontroller address 404-1. The sensor 108-1 may then be activated, while the sensors 108-2 through 108-n remain in the inactive or sleep mode. When the sensor 108-1 is activated, it is associated with a predefined default address 416 having a value of "0000". The predefined default address 416 is also shared with the other sensors 108-2 through 108-n. At block 320, the controller 104 sends the unique target address 408-1 associated with the selected microcontroller address 404-1 to the sensor 108-1 using the default address 416. Since the sensor 108-1 is the only activated sensor 108 capable of receiving commands and/or signals from the controller 104 and having the default address 416, the sensor 108-1 is the only sensor 108 which receives the unique target address 408-1.

Returning to FIG. 3, at block 325, the controller 104 determines whether each of the sensors 108 in the set has been assigned a unique address. For example, since the set of microcontrollers 200 corresponds to the set of sensors 108, the controller 104 may make the determination at block 325, based on the enablement flag for the microcontrollers 200 (or the microcontroller addresses).

If the determination at block 325 is negative, then the controller 104 returns to block 310 to select another microcontroller 200 whose corresponding sensor 108 has not yet been enabled.

Figure 5:
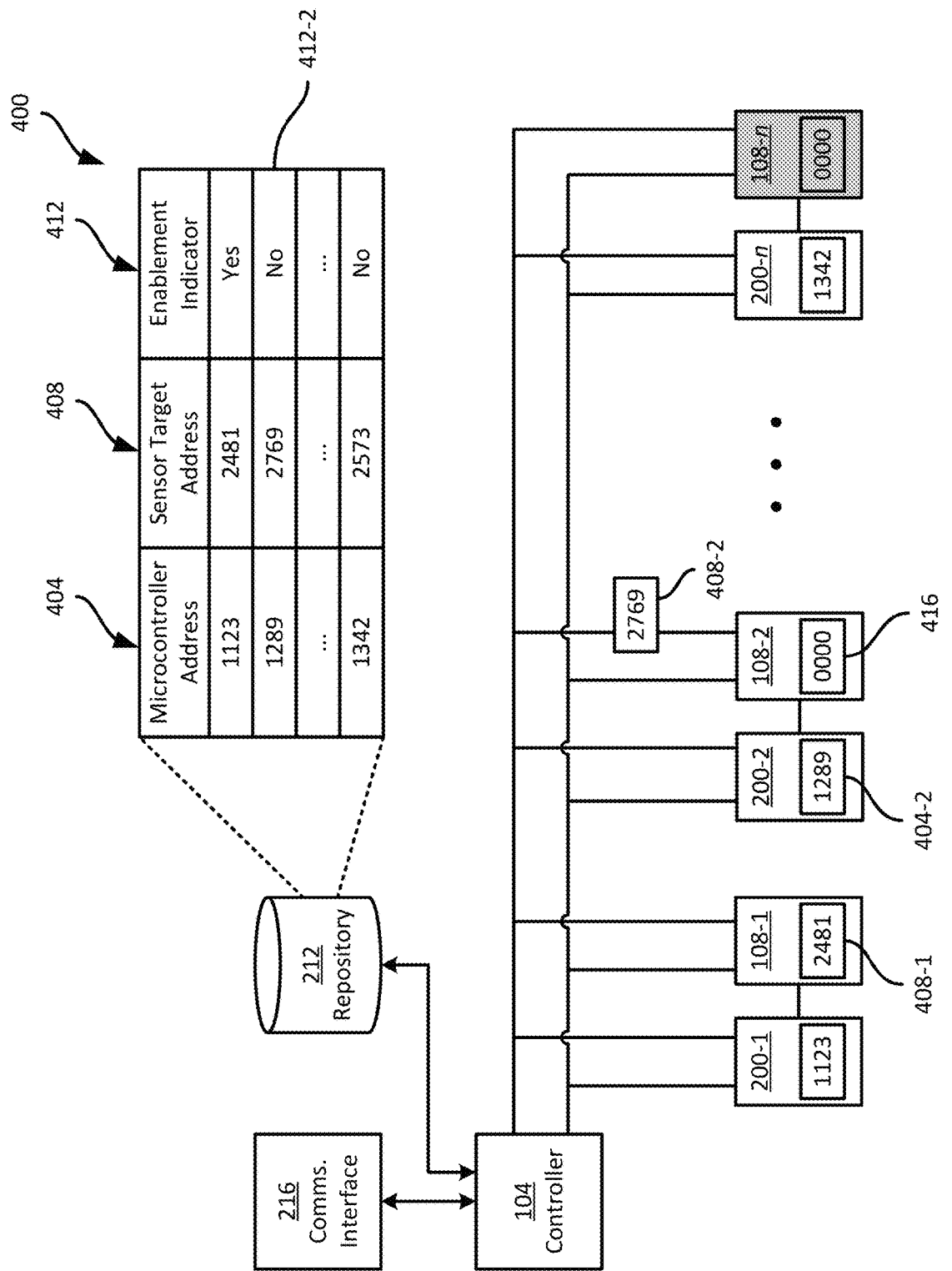
FIG. 5 is a diagram of an example performance of a subsequent iteration of blocks 310 through 320 of the method of FIG. 3.

For example, turning now to FIG. 5, a schematic diagram of a subsequent iteration through blocks 310 to 320 is illustrated. In particular, after receiving the unique target address 408-1, the sensor 108-1 may re-assign its address from the predefined default address 416 having a value of "0000" to the value of the target address 408-1, namely "2481". Further, the controller 104 may update the table 400 to change the enablement indicator 412-1 associated with the selected microcontroller 200-1 to an affirmative value.

Accordingly, on the subsequent iteration, at block 310, the controller 104 may select another microcontroller 200 having an enablement indicator 412 with a negative value. For example, the controller 104 may select the microcontroller 200-2 having a negative enablement indicator 412-2 and a microcontroller address 404-2 having a value of "1289". At block 315, the controller 104 causes the microcontroller 200-2 to activate the corresponding sensor 108-2, for example by sending a signal to the microcontroller address 404-2. The sensor 108-2 may then be activated, while the remaining sensors (i.e., sensors through to 108-n, with the exception of the sensor 108-1 which was previously activated) remain in the inactive or sleep mode. When the sensor 108-2 is activated, it is associated with the predefined default address 416 having a value of "0000". At block 320, the controller 104 sends the unique target address 408-2 associated with the selected microcontroller address 404-2 to the sensor 408-2 using the default address 416. Since the sensor 108-2 is the only activated sensor 108 capable of receiving commands and/or signals from the controller 104 (i.e., the sensors through to 108-n are inactive) having the default address 416 (i.e., the active sensor 108-1 has previously been reassigned the unique target address 408-1), the sensor 108-2 is the only sensor 108 which receives the unique target address 408-2 having a value of "2769".

Accordingly, upon receiving the target address 408-2, the sensor 108-2 may re-assign its address from the predefined default address 416 to the value of the target address 408-2, namely "2769". Further, the controller 104 may update the table 400 to change the enablement indicator 412-2 associated with the selected microcontroller 200-2 to an affirmative value.

Returning again to FIG. 3, if the determination at block 325 is affirmative, then the controller 104 proceeds to block 330. At block 330, the controller 104 may scan the set of sensors 108 using the unique address of each sensor 108 to obtain data detected at each sensor 108. For example, the controller 104 may first poll the first sensor 108-1 using the unique address 408-1 of the first sensor 108-1 to obtain data detected at the first sensor 108-1. The controller 104 may then iteratively poll each of the remaining sensors 108 using the respective unique addresses to obtain data detected at the given sensor 108.

For example, the laser proximity sensors illustrated in FIG. 1 may be polled to determine if there has been a change in proximity detected, and the respective proximities detected by each of the sensors 108 may be aggregated to create a planogram of the items 116 placed on each shelf 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
    a set of sensors, each sensor having a programmable address;
    a set of microcontrollers, each microcontroller paired with one sensor from the set of sensors;
    a controller configured to:
        enable an operational state of the set of sensors to uniquely address each sensor in the set of sensors by sequentially, for each microcontroller in the set of microcontrollers, causing the microcontroller to activate the sensor paired with the microcontroller and assigning a unique address to the activated sensor; and
        scan the set of sensors using the unique address of each sensor to obtain data detected by the sensor,
    wherein the set of sensors comprise laser proximity sensors arranged as a laser curtain to detect items on a support surface by detecting a change in a distance between the laser proximity sensors and the support surface to a distance between the laser proximity sensors and the items on the support surface.

2. The system of claim 1, wherein, prior to enabling the operational state of the set of sensors, each sensor in the set is inactive.

3. The system of claim 1, wherein, upon activating the sensor, the sensor is assigned a default address, the default address being common to at least two of the sensors in the set of sensors.

4. The system of claim 3, wherein, in assigning the unique address to the sensor, the controller is configured to send an instruction to the default address to be reassigned to the unique address.

5. The system of claim 1, wherein the controller is further configured to receive a confirmation of the unique address from each sensor.

6. The system of claim 1, further comprising a repository configured to store:
    (i) a microcontroller address for each microcontroller in the set microcontrollers;
    (ii) a predefined default address for each sensor in the set of sensors; and
    (iii) the unique address to be assigned to each sensor in the set of sensors.

7. The system of claim 6, wherein the repository is further configured to store an enablement indicator associated with each microcontroller in the set of microcontrollers, the enablement indicator indicating whether the paired sensor is enabled.

8. A method comprising:
    enabling an operational state of a set of sensors to uniquely address each sensor in the set by sequentially, for each microcontroller in a set of microcontrollers causing the microcontroller to activate one sensor from the set of sensors, the sensor being paired to the microcontroller and assigning a unique address to the activated sensor; and
    scanning the set of sensors using the unique address of each sensor to obtain data detected by the sensor,
    wherein the set of sensors comprise laser proximity sensors arranged as a laser curtain to detect items on a support surface by detecting a change in a distance between the laser proximity sensors and the support surface to a distance between the laser proximity sensors and the items on the support surface.

9. The method of claim 8, wherein, prior to enabling the operational state of the set of sensors, each sensor in the set is inactive.

10. The method of claim 8, wherein upon activating the sensor, the sensor is assigned a default address, the default address being common to at least two of the sensors in the set of sensors.

11. The method of claim 10, wherein assigning the unique address to the sensor comprises sending an instruction to the default address to be reassigned to the unique address.

12. The method of claim 8, further comprising: after assigning the unique address, receiving a confirmation of the unique address from each sensor.

13. The method of claim 8, further comprising: selecting the microcontroller based on an enablement indicator associated with each microcontroller in the set of microcontrollers, the enablement indicator indicating whether the paired sensor is enabled.

* * * * *